Aug. 4, 1931. J. N. JACOBSEN 1,817,691
DETACHABLE PIPE SECTIONS
Filed July 5, 1927 3 Sheets-Sheet 3
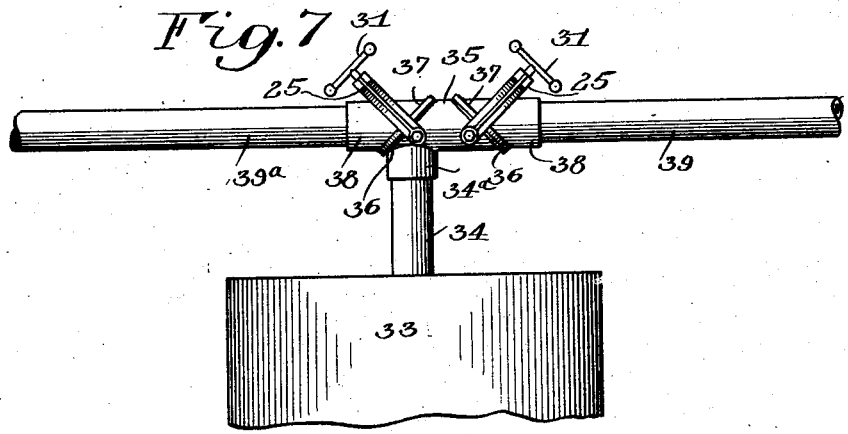
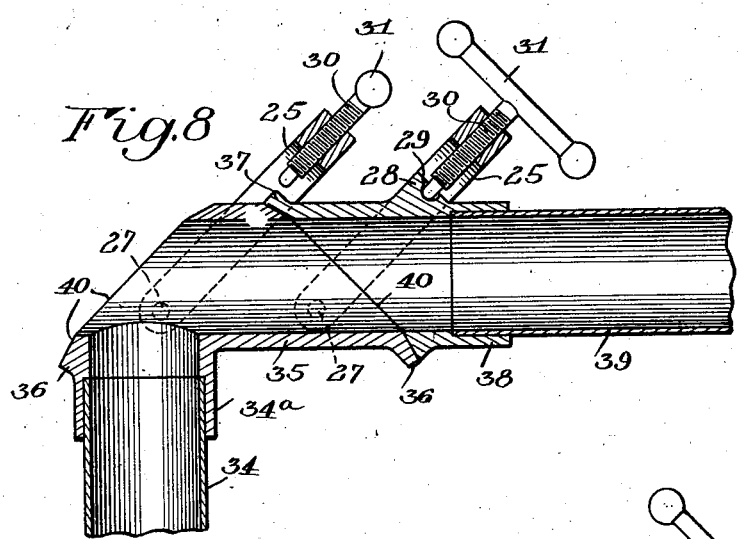
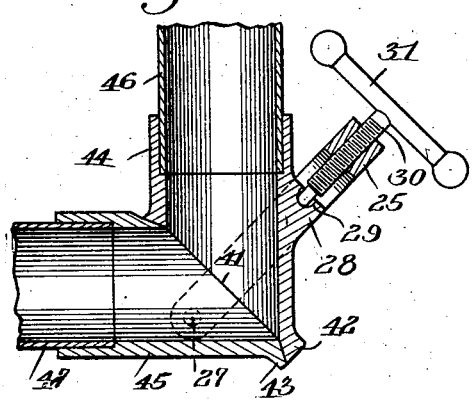
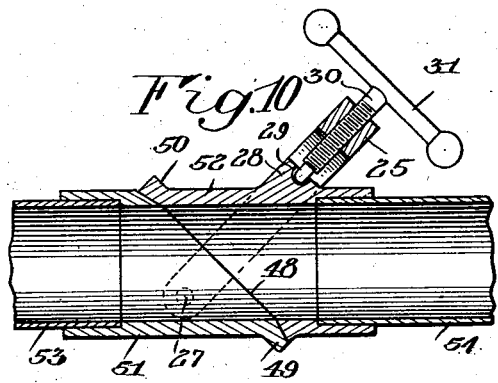
INVENTOR
Jens N. Jacobsen
BY
his ATTORNEYS Patented Aug. 4, 1931

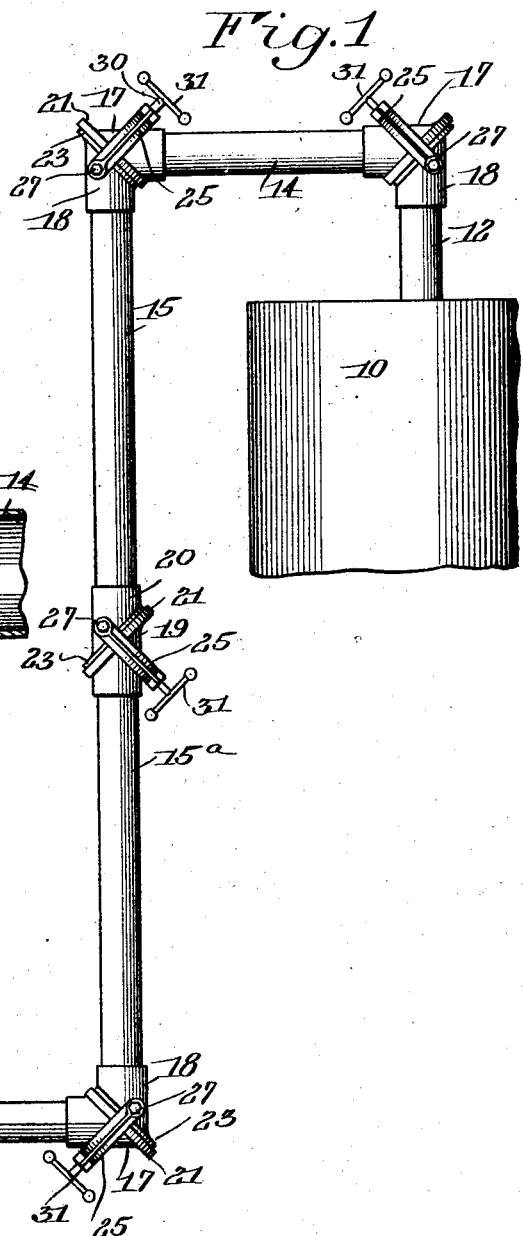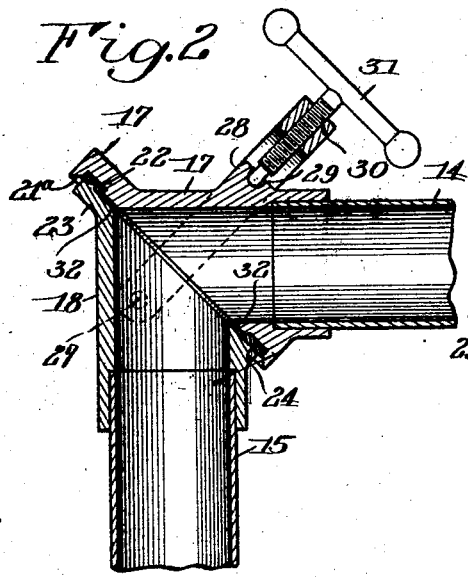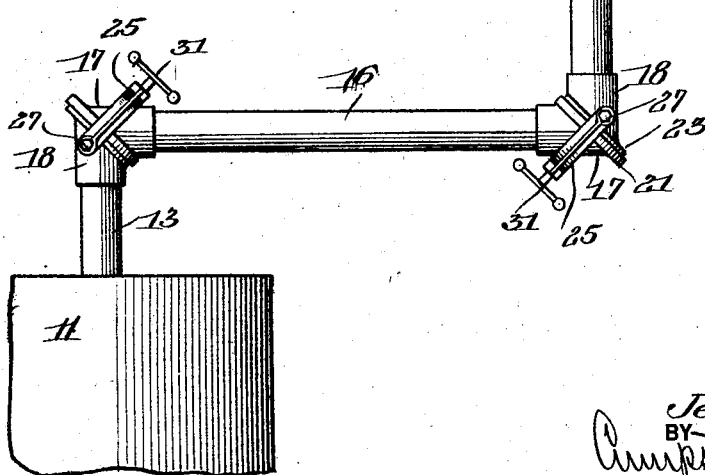

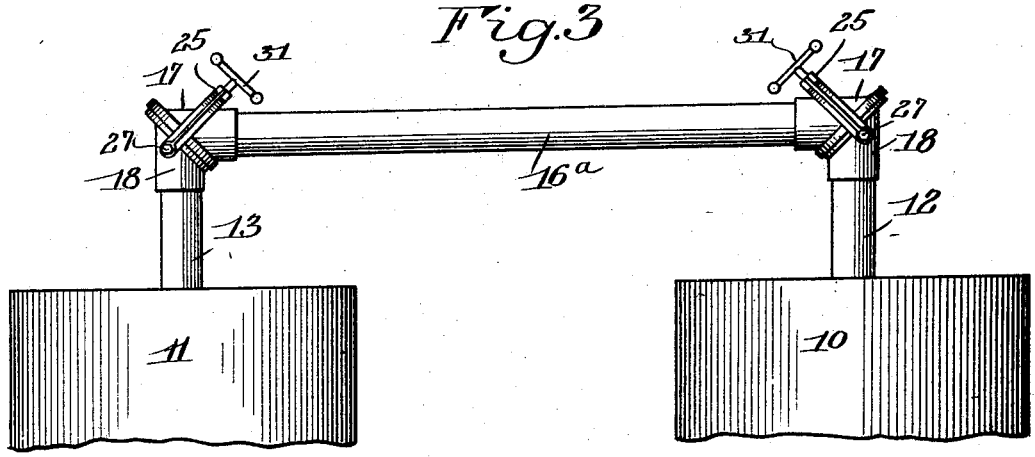
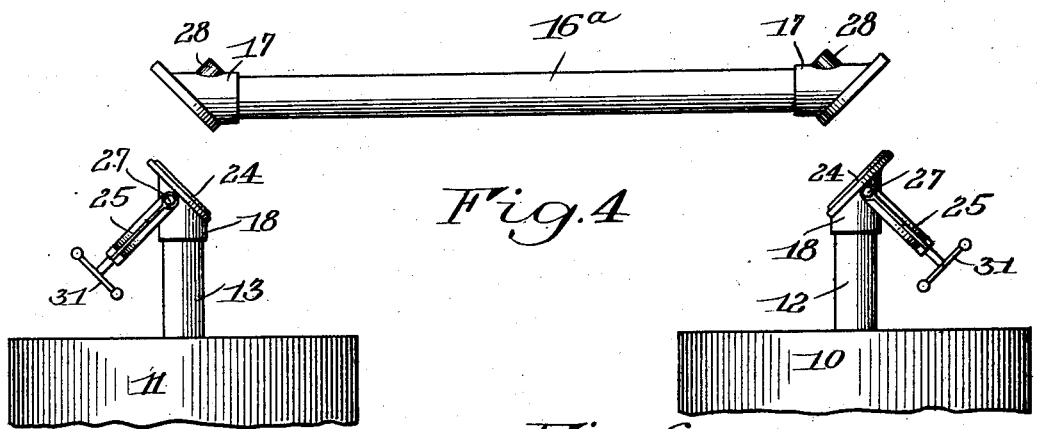
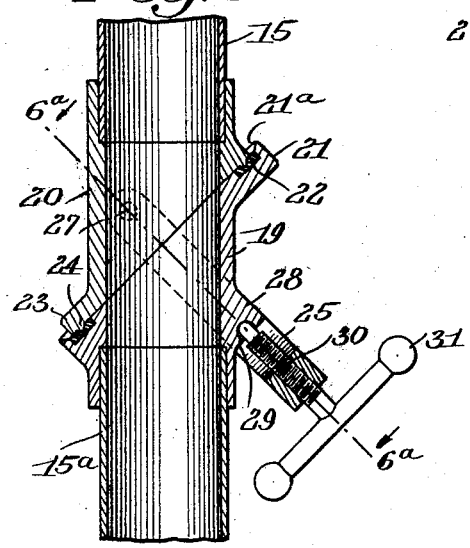
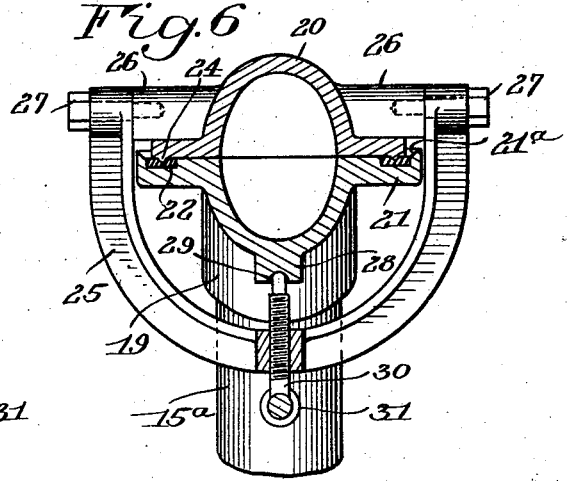

1,817,691

UNITED STATES PATENT OFFICE

JENS N. JACOBSEN, OF ALAMEDA, CALIFORNIA, ASSIGNOR TO THE PFLAUDER COMPANY, OF ROCHESTER, NEW YORK, A CORPORATION OF NEW YORK

DETACHABLE PIPE SECTIONS

Application filed July 5, 1927. Serial No. 203,581.

The present invention relates to sanitary piping and has for its object to provide an improved piping arrangement in which one or more sections of the piping may be quickly applied or removed without the use of threaded or other forms of couplings having pockets in which the liquid will be trapped and without having to force or spring apart the ends of the pipes in order to remove one section from another as necessary with the piping connections heretofore in use.

A further object of the invention is to provide an improved method of connecting piping which will permit one or more of a number of pipe sections to be positioned between or removed from its opposing sections without wedging thereon or obstruction thereby and which is joined with the opposing sections by clamping elements arranged to swing to and from securing position.

A further object of the invention is to provide a piping system including a series of pipes having connecting heads with inclined seats at each point of connection, the seats on the ends of the individual sections in certain cases being inclined in opposite directions to facilitate bodily movement of one section from engagement with its opposing sections without having to spring apart the ends of said sections, the connected ends being secured by pivoted clamping members extending substantially at right angles to the inclined abutting faces of each joint and arranged to swing clear of the section to be removed whereby a lateral or swinging movement of said section is permitted to free it from its opposing sections and whereby a wedging or binding action between the ends of the fixed and removable sections is avoided when detaching one from the other.

A further object of the invention is to provide an improved piping system which can be economically installed and maintained and one in which the joints of the different sections of piping are so constructed as to render the sections entirely free from pockets in which liquid may collect, which is objectionable from a sanitary standpoint, as for example in milk treating or pasteurizing systems where the milk may collect and remain between the treating periods and further to so construct the piping as to permit quick removal of any one section thereof without the use of threaded couplings which, for different reasons are objectionable, but particularly due to the fact that the milk will collect in the threaded joints where it will remain and cause an unsanitary condition.

To these and other ends the invention resides in certain improvements and combinations of parts, all as will be hereinafter more fully described, the novel features being pointed out in the claims at the end of the specification.

In the drawings:

Figure 1 is a view illustrating one embodiment of the invention showing by way of example the manner of connecting separate tanks with the present system of piping;

Figure 2 is an enlarged detail section taken through one of the pipe joints shown in Figure 1;

Figure 3 is a view showing a different form of connection between the tanks from that shown in Figure 1;

Figure 4 is a similar view showing the clamping members swung to release position and the detachable section raised to release position;

Figure 5 is an enlarged fragmentary section taken longitudinally through one of the joints shown in Figure 1;

Figure 6 is a transverse section taken on line 6a—6a of Figure 5;

Figure 7 is a fragmentary view showing the piping sections connected by a modified type of joint;

Figure 8 is an enlarged fragmentary section taken longitudinally through the joint shown in Figure 7 with one section of piping removed;

Figure 9 is an enlarged fragmentary section showing an elbow connection of the ground-joint type; and Figure 10 is a fragmentary longitudinal section of a ground-joint connection for a pair of aligned pipe sections.

Similar reference numerals throughout the several views indicate the same parts.

In the present system of piping, applicant has not only avoided the use of detachable unions, T's and elbows of the threaded type but has so constructed the piping as to make it practical to directly connect the different sections without the employment of detachable couplings which require the pipes to be sprung apart when disconnecting the same, as in the case of the ordinary union where the tapering seat portions overlap or project one into another and are held together by an internally threaded nut.

Other types of couplings have also been employed but in none so far as applicant is aware has it been proposed to form the ends of the various pipe sections in such a manner that one section can be removed from or applied directly to the opposing sections by a lateral or swinging movement without having to spring the sections apart as is necessary with the present forms of pipe couplings.

Referring to the drawings 10 and 11 represent spaced liquid holding tanks or containers, such for example, as may be employed in connection with milk treating or pasteurizing systems. In the form of connection shown in Figure 1, relatively short pipes 12 and 13 extend from the tanks 10 and 11, respectively. With this arrangement four intermediate pipes 14, 15, 15a and 16 complete the connection between the tanks, it being understood, however, that this particular arrangement is merely illustrative of one manner of connecting two or more containers by the present system of piping. In the arrangement shown in Figure 1 each pipe section forms a unit, embodying a pipe proper having fixed on its ends in any suitable manner, preferably by welding, a head or fitting adapted to cooperate with a similar head on an adjacent pipe section. The pipe sections shown in Figure 1 have on their adjacent ends flanged heads 17 and 18 for connecting angularly disposed sections of piping as shown in Figures 1 and 3 while the straight or aligned sections of piping 15 and 15a have on their adjacent ends the flanged heads 19 and 20 which are enlarged and shown in section in Figure 5. In Figure 3 the heads 17 are connected by a pipe section 16a forming a unit which can be lifted as such from coupling position as shown in Figure 4. The heads 17 and likewise the heads 19 are each provided with an angularly disposed flange 21 having an annular recess in which is disposed a gasket 22 as shown in Figure 5. Each of the heads 18 and 20 is provided with an angularly disposed flange 23 having an upstanding annular bead or projection 24 adapted when the heads are clamped together to project within the gasket as shown in Figure 5 whereby to insure a more perfect joint between the opposed flanges of the heads. The flanges 21 of the heads 17 are chamfered or beveled as shown at 21a to facilitate removal of one pipe section from another. Each pair of heads 17 and 18 and likewise the heads 19 and 20 are tightly clamped together by a bail 25 having its extremities seated on boss like projections 26 on the heads 18 and 20 as shown in Figure 6. The bail is free to swing on pivot bolts 27 extending through its ends and threaded into the bosses 26 at opposite sides of the heads. The heads 17 and 19 are provided with boss like projections 28 having recesses 29 for receiving the inner rounded ends of the clamping screws 30, threaded through the central portions of the bails as shown in Figures 5 and 6. The screws are provided with handles 31 for adjusting the same in order that the bails may be released and swung to and from securing position as shown in Figure 4.

A slight difference in the type of joint shown in Figure 2 over that shown in Figure 5 embodies the use of an additional gasket 32 disposed inwardly of the gasket 22 to more perfectly seal the joint between the flanges of the heads 17 and 18. This additional gasket may also be employed with the type of joint shown in Figure 5 if desired.

In Figures 7 to 10, inclusive, the gaskets have been omitted and ground joints shown instead between the different forms of couplings disclosed in these views.

In Figure 7 the tank 33 carries a short pipe 34 on which is mounted a new form of T 35, the oppositely inclined seat portions 36 of which are adapted to receive the flanges 37 of the heads 38 with which are suitably connected, as by welding, the pipes 39 and 39a. The ground joints between the T and heads are indicated at 40 in Figure 8. The bails 25 are pivoted to the opposite ends of the T by bolts 27 in a similar manner to that shown in Figure 6, the recessed projections 28 on the heads 38 for receiving the rounded ends of the clamping screws 30 being also of the same as indicated in Figure 5.

The new form of T or angular coupling 35 has the important advantage of permitting the angularly disposed pipes 34 and 39 shown in Figure 8 to be cleaned out by the use therein of a swab or other suitable cleaning member which can be readily inserted in both of said pipes through the same end of the T. This is made possible by shifting the portion 34a of the T from its usual position at the center thereof to one end and inclining the seat 40 in the manner shown in Figure 8 to provide a clear opening common to both branches of the T, that is, when the lefthand pipe section 39a is removed. In this construction the axes of the pipes 34 and 39 intersect at one end of the T rather than in the middle thereof as in the usual form of T construction. Thus, a swab with a straight handle can be used to clean both pipes 34 and 39 by passing it in different directions through the opening at the left hand end of the T as viewed in Figure 8.

In Figure 9, the elbow construction is the same as that shown in Figure 2 except that the gaskets are omitted and a ground joint 41 employed between the flanges 42 and 43 of the heads 44 and 45 which are adapted to receive the pipes 46 and 47, respectively, in the same manner as shown in Figure 2. The parts for clamping the heads together are the same as in the other views and therefore have been given the same reference characters.

Likewise the joint shown in Figure 10 corresponds to that shown in Figure 5, except that the gasket is omitted and a ground joint 48 employed between the flanges 49 and 50 of the heads 51 and 52, connecting the pipes 53 and 54, which are preferably secured within the heads in the same manner as indicated in the other types of joints described above. The heads in Figure 10 are also clamped together through the medium of the same parts employed in the other forms of joints shown, including the bail 25 and clamping screw 30. It will be seen, therefore that with each type of joint shown, any given section of piping forming a portion of the whole can be quickly removed from the system without having to unscrew the usual couplings, unions and the like. Furthermore, with the previous forms of connections the tapering seats of the opposing parts project one within the other, thus making it necesary to spring the sections apart, which is a more or less difficult operation and which often causes injury to the threads of the adjacent sections, to the extent that the joints become leaky.

While I am aware that it has been proposed to clamp certain forms of pipe couplings together rather than threadedly connect the same, in no case, so far as I am informed has it been possible to bodily remove one section of piping from between opposing sections without detaching any of the parts thereof or without springing the ends of the sections apart, for the reasons explained above, or without providing relatively large joints in which pockets are formed and which trap the liquid and render the piping unsanitary and unsatisfactory for service in connection with milk treating systems or other liquid storing or handling systems. The present invention, for the reasons stated above, embodies a sanitary and economical form of piping in which any section is removable as a unit, merely by loosening its clamping screw and swinging the bail to release position in order that the section may be moved bodily from between its opposing sections without wedging and without separate detachment of any of the parts serving to connect the sections together.

In the piping system embodied in the present invention the internal diameter of the pipes is uniform throughout and there are no pockets in the heads or couplings, or at any other point in which liquid will collect when the supply is temporarily cut off from the pipes and the liquid allowed to drain therefrom. This is particularly important in milk handling or treating systems, where it is necessary to prevent the collection of small quantities of milk in the piping to avoid the unsanitary conditions resulting therefrom.

Another advantage of the detachable pipe sections of the present invention is that a swab or cleaning tool can readily be run through a number of non detached pipe sections after removing one of the units in the system, for the reason that the elbow couplings, when one part is detached from the other, have no right angle bends, as in the case of the usual form of elbow. In other words, when, for example, the section 16a is removed it is taken off as a unit and a swab can then be run through the pipes 12 and 13, Figure 4, as well as through the section 16a itself, without having to separately detach from the piping the usual form of elbow.

I claim as my invention:

1. In apparatus of the class described, the combination with a pair of aligned pipe sections and a transversely extending pipe section, of a head connecting said sections including angularly disposed branches, said head having an opening through which a cleaning tool may be inserted into both branches when one of the sections is detached by moving the tool in paths coaxial with said branches, said head having a seat for one of the alined sections surrounding said opening at the point of intersection of the alined and transversely extending pipe sections.

2. In apparatus of the class described, a pair of connected pipe sections having angularly disposed intersecting bores terminating in a common opening defined by a surrounding seat for the reception of a third section, the axis of said opening being intersected by the axes of said bores substantially at the point of intersection of said axes, said opening permitting of the movement therethrough of a cleaning tool for said bores into and axially of either of the bores.

3. In apparatus of the class described, a pipe section, a pair of pipes each extending at an angle to said pipe section, a head connecting said pipes and pipe section and having angularly disposed bores terminating in a common opening defined by a surrounding seat with which one of said pipes is detachably connected, the axes of said bores intersecting at a point substantially in the plane of the seat and means operating to clamp said detachable pipe upon said seat.

JENS N. JACOBSEN.

CERTIFICATE OF CORRECTION.

Patent No. 1,817,691.                                                 Granted August 4, 1931, to

JENS N. JACOBSEN.

It is hereby certified that the name of the assignee in the above numbered patent was erroneously written and printed as "The Pflauder Company", whereas said name should have been written and printed as The Pfaudler Company, as shown by the records of assignments in this office; and that the said Letters Patent should be read with this correction therein that the same may conform to the record of the case in the Patent Office.

Signed and sealed this 22nd day of September, A. D. 1931.

M. J. Moore,
(Seal)                                                        Acting Commissioner of Patents.